United States Patent [19]

Veselkov et al.

[11] 4,286,270

[45] Aug. 25, 1981

[54] DOUBLE-CHANNEL SATELLITE NAVIGATION SYSTEM

[76] Inventors: Alex A. Veselkov, ulitsa Zastavnaya, 13; Ivan F. Glumov, ulitsa Kotovskogo, 13, kv. 59; Leonid A. Zlotnikov, ulitsa Polevaya, 24, kv. 37; Viktor P. Maiko, ulitsa Pionerskaya, 6, kv. 5, all of Gelendzhik; Jury F. Matusevich, ulitsa Yankovskogo, 102, kv. 21, Krasnodar, all of U.S.S.R.

[21] Appl. No.: 36,341

[22] Filed: May 7, 1979

[51] Int. Cl.³ .............................................. G01S 5/02
[52] U.S. Cl. .......................... 343/113 DE; 343/100 ST
[58] Field of Search ........ 343/113 DE, 113 R, 112 C, 343/100 ST

[56] References Cited
U.S. PATENT DOCUMENTS 3,696,427  10/1972  Nard ................................ 343/112 R Primary Examiner—Theodore M. Blum
Attorney, Agent, or Firm—Steinberg & Raskin

[57] ABSTRACT

The double-channel satellite navigation system according to the invention comprises two identical channels whereof each contains a mixer. The inputs of the two mixers receive the high and low frequency components, respectively, of a double-frequency signal sent by a navigation satellite. Each of the mixers has its output connected to the input of a phase detector. Each of the channels further contains an extrapolator and a commutator which are placed in series. The output of the phase detector is electrically connected to the input of the extrapolator and a second input of the commutator whereof the output is connected to the input of a voltage-controlled oscillator. Finally, the system includes a signal level analyzer intended to analyze the level of signals arriving from the navigation satellite. The signal level analyzer has its output connected to a second input of the extrapolator and a third input of the commutator.

2 Claims, 1 Drawing Figure

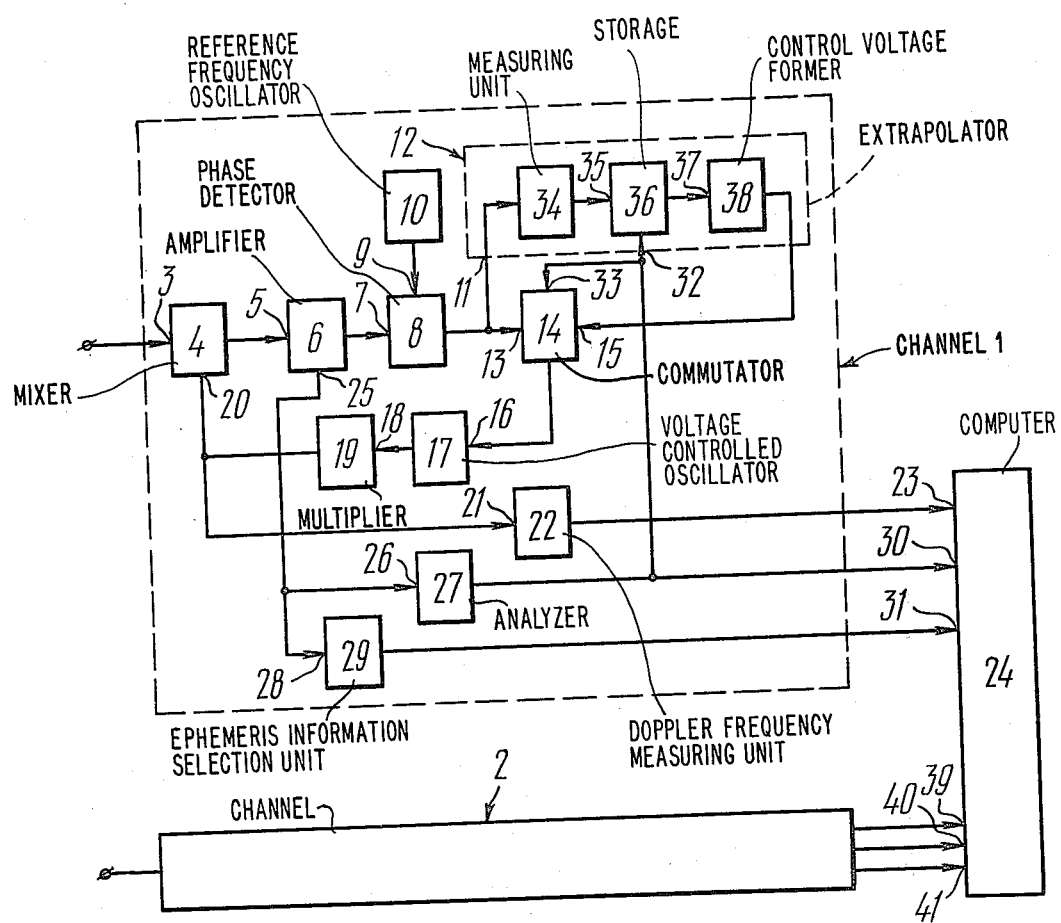

DOUBLE-CHANNEL SATELLITE NAVIGATION SYSTEM

FIELD OF THE INVENTION

The present invention relates to means for receiving and processing signals from navigation satellites and, more particularly, to a double-channel satellite navigation system.

Satellite navigation systems are chiefly used to determine the location of stationary or mobile objects on the surface of the Earth.

BACKGROUND OF THE INVENTION

A maximum accuracy of determining the coordinates of objects makes it necessary that the Doppler frequency should be continuously measured over the entire period of time the satellite is within the visibility zone of the object.

The Doppler frequency is measured by counting the number of Doppler signal periods contained within a known period of time referred to as the sampling or measurement interval. No Doppler signal is formed during a brief loss of signal from the navigation satellite. The count during this period is wrong and cannot be used to calculate the Doppler frequency. During the processing stage, each count gives a position line on the Earth's surface on which the object is found. The greater the number of such position lines, the higher the accuracy with which the coordinates of the object are determined. The loss of each measurement interval affects the object localization accuracy; the loss of a substantial number of such intervals makes the solution of a navigation problem an impossibility.

Today, extensive use is made of satellite navigation systems of the type that comprises data processing means and a receiver of signals sent by a satellite and carrying information on the orbital position of the satellite and orbit parameters. The measuring parameter in such systems is the Doppler shift of the carrier frequency of the transmitter borne by the satellite.

There is known a double-channel satellite navigation system (cf. the JMR publication "The JMR-1 Doppler Survey Set. Description and Application", 1976) comprising a mixer whose imputs receive a signal arriving from a navigation satellite and a signal arriving from an automatic phase frequency control unit. The output of the mixer is electrically coupled via an amplifier to a signal level analyzer, a data selection unit, a Doppler frequency measuring unit and an automatic phase frequency control unit. Reference-frequency voltage for the automatic phase frequency control unit is supplied by a reference-frequency oscillator. From the outputs of the signal level analyzer, data selection unit and Doppler frequency measuring unit, information is supplied to respective inputs of a data recorder.

In case of a drop, however brief, of the level of the satellite's signal below a point which insures normal operation of the system, the Doppler count during the entire measurement interval is wrong and cannot be used to solve the navigation problem. The result is a poor accuracy of determining the coordinates of the object.

There is further known a double-channel satellite navigation system wherein each channel comprises a mixer. The inputs of the two mixers receive the high and low frequency components, respectively, of a double-frequency signal sent by a navigation satellite. Each of the two mixers has its output electrically coupled to a first input of a phase detector whose second input is connected to a reference-frequency oscillator. The output of the phase detector is electrically connected to an input of a voltage-controlled oscillator whose output is connected to an input of a frequency multiplier. The latter has its output connected to a second input of the mixer and to an input of a Doppler frequency measuring unit. A signal from the output of the Doppler frequency measuring unit is sent to a computer. The mixer has its output electrically connected to an input of a signal level analyzer and to an input of an ephemeris information selection unit. Signals from the outputs of the latter two units are transmitted to a computer (cf. the Magnavox publication: "Technical Manual. Operation and Service Instructions for Satellite Navigation Set MX 702A", 1975).

In the system under review, the output of the phase detector is connected to the input of the voltage-controlled oscillator via a low frequency filter.

In the case of a drop, however brief, of the level of the satellite's signal below a point which insures normal operation of the system, the Doppler count during the entire measurement interval is wrong and cannot be used to solve the navigation problem. As in the case of the previously discussed system, this affects the accuracy of determining the coordinates of objects.

SUMMARY OF THE INVENTION

It is an object of the present invention to provide a double-channel satellite navigation system which makes it possible to improve the accuracy and reliability of determining the location of an object each time the navigation satellite is in the field of vision of the object.

The foregoing object is attained by providing a double-channel satellite navigation system wherein each of the two channels comprises a mixer whose input receives a high or low frequency component of a double-frequency signal transmitted by a navigation satellite, the mixer having its output electrically coupled to a first input of a phase detector whose second input is connected to a reference frequency oscillator, the phase detector having its output electrically coupled to an input of a voltage-controlled oscillator whose output is connected to an input of a frequency multiplier having its output connected to a second input of the mixer and to an input of a Doppler frequency measuring unit which transmits its output signal to a computer, the mixer having its output electrically connected to an input of a signal level analyzer and to an input of an ephemeris information selection unit, output signals of the signal level analyzer and ephemeris information selection unit being sent to the computer. In accordance with the invention each of the two channels includes an extrapolator and a commutator placed in series, the phase detector having its output connected to an input of the extrapolator and a second input of the commutator whose output is connected to the input of the voltage-controlled oscillator, the signal level analyzer having its output connected to a second input of the extrapolator and a third input of the commutator.

It is desirable that the extrapolator should include, in a series arrangement, a parameter measuring unit, a storage and a control signal former.

In case of a loss of signal from the navigation satellite, the extrapolator and commutator produce a control voltage variable just as before the loss of signal. As a result, the signal at the output of the multiplier, which carries information on the Doppler frequency, varies just as before the loss of signal from the satellite. The output signal of the multiplier is applied as a heterodyne signal to one of the inputs of the mixer. Thus, at the instant the satellite signal is received again, the difference frequency at the output of the mixer and, consequently, at the input of the phase detector, is equal to the rated intermediate frequency, and the voltage at the output of the phase detector is equal to that at the input of the controlled oscillator.

The signal parameter measuring unit, storage and control signal former, placed in series, make it possible to form an output signal of the extrapolator, which is identical to the input signal of the phase detector prior the loss of signal from the satellite. The above units also account for the fact that following a loss of the satellite signal, the output signal changes just as it did prior to the loss of the satellite signal.

BRIEF DESCRIPTION OF THE ATTACHED DRAWING

Other objects and advantages of the present invention will become more apparent from a consideration of the following detailed description of a preferred embodiment thereof, taken in conjunction with the accompanying drawing which is a block diagram of a double-channel satellite navigation system in accordance with the invention.

DETAILED DESCRIPTION OF THE INVENTION

Referring to the attached drawing, the double-channel satellite navigation system according to the invention comprises two identical channels, 1 and 2.

A navigation satellite transmits a double-frequency signal carrying information of the position of the satellite in space. The signal is received by an antenna and applied to a preamplifier (not shown) so as to compensate for losses in the feeder. The higher frequency signal is sent to the channel 1, while the lower frequency signal is sent to the channel 2. In the channel 1, the signal is preamplified and applied to an input 3 of a mixer 4 whose output is connected to an input 5 of an intermediate-frequency amplifier 6.

The amplifier 6 has its output connected to an input 7 of a phase detector 8. A second input 9 of the phase detector 8 is connected to a reference frequency oscillator 10. The phase detector 8 has its output connected to an input 11 of an extrapolator 12 and to an input 13 of a commutator 14. An output of the extrapolator 12 is connected to a second input 15 of the commutator 14.

The commutator 14 has its output connected to an input 16 of a voltage-controlled oscillator 17 whose output is connected to an input 18 of a frequency multiplier 19. The frequency multiplier 19 has its output connected to a second input 20 of the mixer 4 and to an input 21 of a Doppler frequency measuring unit 22. The output signal of the unit 22 is transmitted to an input 23 of a computer 24. The computer 24 may comprise any suitable computer known in the art, programmed in a known manner to function as desired. A suitable computer is the 21MX computer of Hewlett Packard Company, Cupertino, Calif., described in the 21MX Computer Series Reference Manual, Hewlett Packard Company, 11000 Wolfe Road, Cupertino, Calif. 95014, 1976. A suitable program, for accomplishing the objectives of the system of the invention, is described in this manual.

A second output 25 of the intermediate-frequency amplifier 6 is connected to an input 26 of a satellite signal level analyzer 27 and to an input 28 of an ephemeris information selection unit 29. Output signals of the analyzer 27 and unit 29 are sent to inputs 30 and 31, respectively, of the computer 24.

The satellite signal level analyzer 27 has its output connected to a second input 32 of the extrapolator 12 and a third input 33 of the commutator 14.

In the embodiment under review, the extrapolator 12 comprises a parameter measuring unit 34 whose input serves as the input 11 of the extrapolator 12. The measuring unit 34 has its output connected to an input 35 of a storage 36 whose output is connected to an input 37 of a control voltage former 38. The output of the control voltage former 38 is the output of the extrapolator 12. A second input of the storage 36 is the input 32 of the extrapolator 12.

Outputs of the channel 2 are similar to those of the channel 1 and connected to inputs 39, 40 and 41 of the computer 24.

The double-channel navigation system of to the invention operates as follows.

The mixer 4 transforms its input signal into an intermediate-frequency signal. The frequency of the signal across the output of the mixer 4 is equal to the frequency difference between the input signal transmitted by the navigation satellite and the signal which arrives from the multiplier 19. The intermediate-frequency signal is amplified by the intermediate-frequency amplifier 6. The phase detector 8 compares the phase of the amplified intermediate-frequency signal with that of the signal produced by the reference frequency oscillator 10. The output voltage of the phase detector 8 is proportional to the difference of the phases of the signals at its inputs. While receiving signals from the satellite, this voltage serves as the control voltage for the voltage-controlled oscillator 17 and is applied thereto. The frequency of the oscillator 17 is dependent on the voltage applied to it and is multiplied by the frequency multiplier 19.

When measuring the frequency of the signal arriving from the satellite, the output voltage of the phase detector 8 is varied so as to change the frequency of the voltage controlled oscillator 17 and that of the signal across the output of the multiplier 19 in order to keep the intermediate frequency at a constant level equal to that of the reference signal.

Thus, the information of the variation of the frequency of the signal transmitted by the satellite due to the Doppler effect is contained in the output signal of the multiplier 19. This signal is transmitted to the Doppler frequency measuring unit 22 which measures the Doppler frequency and sends the results of the measurements to the computer 24.

The intermediate-frequency voltage is applied to the ephemeris information selection unit 29 which selects the information and sends it to the computer 24. The intermediate-frequency signal is also used to analyze the level of the signal transmitted by the satellite, which operation is carried out by the satellite signal level analyzer 27. Whenever the level of the signal arriving from the satellite drops below a permissible point, there is a change in the output voltage of the analyzer 27, which is applied to the computer 24 and is also applied as a control potential to the commutator 14 and extrapolator 12.

The extrapolator 12 functions as follows. Control voltage is applied from the phase detector 8 to the parameter measuring unit 34 which determines the value of that voltage, as well as a first derivative and a second derivative of that change. These parameters are fed into the storage 36. If the level of voltage at the input 32 of the extrapolator 12 corresponds to the normal level of the signal transmitted by the satellite, input signals of the storage 36 are passed to its output unchanged. However, if voltage at the input 32 of the extrapolator 12 changes by a value corresponding to a loss of signal, output signals of the storage 36 are maintained at the level they had before the loss of signal from the satellite and are thus independent of the input signals.

Output signals of the storage 36, whereof the voltage is proportional to respective parameters of the control voltage, are applied to the input 37 of the control voltage former 38 which uses the voltage level, as well as the first and second derivatives to synthetize a control signal identical with that at the input of the parameter measuring unit 34.

In case of a loss of signal from the satellite, the control potential is applied from the output of the signal level analyzer 27 to the input 33 of the commutator 14. The output of the commutator 14 is disconnected from its input 13 and coupled to the input 15, whereby the control voltage is applied from the extrapolator 12 to the voltage-controlled oscillator 17. The frequency of the voltage-controlled oscillator 17 changes just as it did before the loss of signal from the satellite.

As the signal of the satellite is received again, the potential at the input 33 of the commutator 14 connects the output of said commutator to its input 13, whereby the voltage-controlled oscillator 17 is controlled by the voltage applied from the phase detector 8. The control potential is applied to the input 32 of the extrapolator 12 and thus enables the transmission of signals from the input of the storage 36 to its output.

Thus, the combination of the commutator 14 and extrapolator 12 insures accurate Doppler frequency measurements in cases of a brief loss of signals from the navigation satellite.

What is claimed is:

1. A double-channel satellite navigation system whereof outputs are electrically connected to a computer, each of its two channels comprising:
    a mixer having a first input intended to receive one frequency component of a double-frequency signal transmitted by the navigation satellite, a second input and an output;
    an amplifier having a first input, a second input and an output, said first input of said amplifier being connected to said output of said mixer;
    a phase detector having a first input, a second input and an output, said first input of said phase detector being connected to said output of said amplifier;
    a reference frequency oscillator having an output connected to said second input of said phase detector;
    an extrapolator having a first input, a second input and an output, said first input of said extrapolator being connected to said output of said phase detector;
    a commutator having a first input, a second input, a third input and an output, said first input of said commutator being connected to said output of said phase detector, said second input of said commutator being connected to said output of said extrapolator;
    a voltage-controlled oscillator having an output and an input connected to said output of said commutator;
    a frequency multiplier having an input connected to said output of said voltage-controlled oscillator, and an output connected to said second input of said mixer;
    a Doppler frequency measuring unit having an input connected to said output of said frequency multiplier, and an output which serves as an output of the channel;
    a signal level analyzer having an input connected to said output of said amplifier, and an output connected to said second input of said extrapolator and to said third input of said commutator and serving as an output of the channel;
    an ephemeris information selection unit having an input connected to said output of said amplifier, and an output which serves as an output of the channel.

2. A double-channel satellite navigation system as claimed in claim 1 wherein said extrapolator comprises:
    a parameter measuring unit having an output and an input which serves as said first input of said extrapolator;
    a storage having an output, a first input connected to said output of said parameter measuring unit, and a second input which serves as said second input of said extrapolator;
    a control signal former having an input connected to said output of said storage, and an output which serves as said output of said extrapolator.

* * * * *